(12) United States Patent
Slater (10) Patent No.: US 6,560,245 B1
(45) Date of Patent: May 6, 2003

(54) TELECOMMUNICATIONS SYSTEM (75) Inventor: Iain J Slater, Nottingham (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/432,318

(22) Filed: Nov. 2, 1999

(30) Foreign Application Priority Data

Aug. 10, 1999 (GB) ............................................. 9918725

(51) Int. Cl.[7] ................................................. H04J 3/02
(52) U.S. Cl. ........................ 370/537; 370/503; 375/354
(58) Field of Search ................................ 570/498, 503, 570/507, 520, 537, 538, 539, 535, 510, 512, 514; 375/354, 355, 356, 362, 359, 365

(56) References Cited

U.S. PATENT DOCUMENTS 5,886,996 A * 3/1999 Wolf .......................... 370/507
5,956,347 A * 9/1999 Slater ......................... 370/503
6,163,551 A * 12/2000 Wolf .......................... 370/503
6,411,633 B1 * 6/2002 Wolf .......................... 370/503
6,418,151 B1 * 7/2002 Walter ........................ 370/503
6,317,475 B1 * 11/2002 Kasurinen ................... 370/503

* cited by examiner

*Primary Examiner*—Douglas Olms
*Assistant Examiner*—Ricardo M. Pizarro
(74) *Attorney, Agent, or Firm*—Kirschstein, et al.

(57) ABSTRACT

In a network of SDH equipments (e.g. synchonous multiplexers add-drop or SMA) for the communication of signals comprising data, a synchronization signal for synchronizing the data and a synchronization status message (SSM) indicating the quality of the source of the synchronization signal, when a synchronization signal is output via a sychronization signal output (SSO) to a stand-alone synchronization equipment (SASE) for conditioning and subsequently input via a synchronization signal input (SSI), the SSM information may be lost. The invention provides means for associating, within the SDH equipment, the revelant SSM with the synchronization signal input at the SSI.

14 Claims, 11 Drawing Sheets

TELECOMMUNICATIONS SYSTEM

BACKGROUND OF THE INVENTION

The present invention relates to the field of synchronous hierarchy communications networks, for example synchronous digital hierarchy (SDH) and SONET networks and to the synchronisation of network elements within such networks.

A synchronous hierarchy communications network comprises a number of interconnected nodes or network elements (NE), e.g. SDH equipment (SE), arranged to exchange data, synchronisation and control signalling according to a synchronous hierarchy, as set out for example in the synchronous digital hierarchy (SDH) or SONET standards. Typically a synchronisation signal will be passed from one NE to the next, along with the data signal, so creating a synchronisation path through communicating NEs via data ports. At least some NE's are also provided with NE clock interfaces for receipt and transmission of synchronisation signals. The synchronisation is carried by virtue of the synchronisation signal's aggregate bit rate rather than the data it contains. The signal also carries the synchronisation status message (SSM).

For brevity in the following reference will be made to SDH, it being understood that the invention is also applicable to SONET. A significant feature of SDH systems is the ability of networks to automatically recover from synchronisation failures. To support this feature each NE requires a pre-configured synchronisation source priority table and each synchronisation signal must carry an indication of the quality of the timing source from which it is derived. In SDH networks, this indication of quality is carried in the SSM. For any one STM-N output, the NE will autonomously select from the SSM values of the available sources the one with the highest quality. The selection of which source to use to synchronise data signals sent out from different (STM-N) ports of an NE is also controlled by the pre-configured priority table of that equipment. For any one STM-N output, one or a number of synchronisation sources can each be assigned a priority and the NE can use the priority table to identify the source with the highest priority. In practice priority is only used to select a synchronisation source if there are more than one available with the same, highest quality, or if a valid SSM is not available.

The NE clock interfaces include one or more synchronisation signal inputs (SSI, often called 'T3' inputs) and synchronisation signal outputs SSO, often called 'T4' outputs). The T3 inputs are used to provide one or more external synchronisation reference signals for injecting into a network of NEs. One specific use of the NE clock interfaces is to provide access to a Stand-Alone Synchronisation Equipment (SASE) which is employed at certain points in a SDH network to both monitor and improve the quality of the synchronisation signal at intermediate points in the synchronisation path.

Data (STM-N) signals comprise data, synchronisation information and synchronisation signal quality information (ie SSMs). In conventional NEs the clock rate of the synchronisation signal selected from the STM-N inputs is divided down within the NE to 2.048 MHz (i.e. 2.048 Mbit/s if carrying data) for output at the T4 port. Thus the T4 synchronisation signal does not have the same frequency or bit rate as the STM-N signal but does contain synchronisation information derived from it. It follows that the T3 input synchronisation signal is expected to also have a frequency (or data rate) of 2.048 MHz (or Mbit/s) and this signal frequency is multiplied within the NE to yield a synchronisation signal at the STM-N rate and synchronised to the T3 input synchronisation signal for output with STM-N data signals.

The SSM has been defined for carrying signal quality information since before 1990 for STM-N signals but only recently has the SSM been defined for NE clock interfaces which operate at 2.048 Mbit/s. Consequently very few existing NEs support the SSM at NE clock interfaces. This lack of support means that such NE clock interfaces cannot be used to pass SSM signals.

A problem exists in current NEs where the SSM is not supported at these NE clock interfaces. It is difficult to build a synchronisation network which is able to automatically recover from many types of fault unless all parts of the synchronisation path can support the SSM feature. There is therefore a need for NEs to be able to propagate a received SSM even though the NEs may not be capable of sending or receiving SSMs on NE clock interfaces (e.g. via a SASE).

A similar situation exists in SONET networks. SONET uses 51.84 MHz Mbit/s STS-N "synchronous transport signal" in place of STM-N and 1.544 MHz (Mbit/s) clock interfaces in place of 2.048 MHz (Mbit/s).

SUMMARY OF THE INVENTION

The present invention provides a telecommunications system comprising a plurality of interconnected network elements (NE), in which each NE comprises one or more ports; each NE for inputting from the or each other NE via the port or ports a signal comprising data and a synchronisation signal for synchronising the data and a quality level indication (QLI) determined by the quality of the source of the synchronisation signal; each NE for outputting to the or each other NE via the port or ports a signal comprising data and a synchronisation signal for synchronising the data and a quality level indication (QLI); in which a particular one of the plurality of NEs comprises a synchronisation signal output (SSO) for outputting a particular synchronisation signal received as part of the signal at the port or at a particular one of the ports; in which the particular NE comprises a synchronisation signal input (SSI) for inputting the particular synchronisation signal output from the SSO with no QLI, in which the particular NE comprises means for sending the particular synchronisation signal input at the SSI, as part of the signal output from the or each port for synchronising the data therein; and in which the NE also comprises QLI means for associating the particular one of the input QLIs determined by the quality of the source of the particular synchronisation signal with the particular synchronisation signal input at the SSI for sending as part of the signal output from the or each port.

BRIEF DESCRIPTION OF THE DRAWINGS

An embodiment of the invention will now be described by way of example with reference to the drawings in which.

DETAILED DESCRIPTION OF PREFERRED EMBODIMENTS

Figure 1:
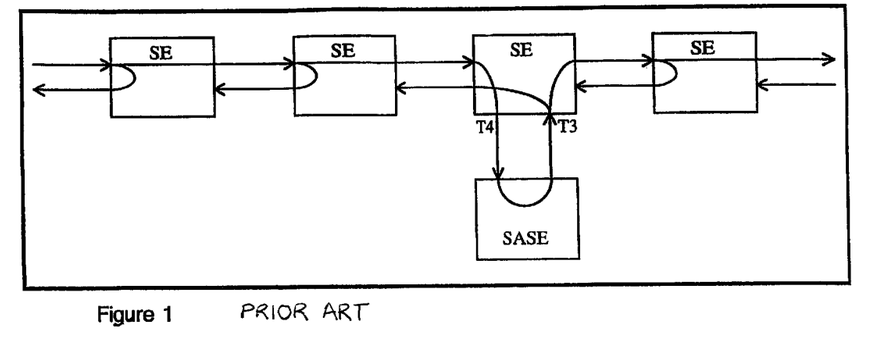
FIGS. 1 to 8 show in block diagram form various aspects of a chain of SDH equipments according to the prior art.

FIG. 1 shows a simple chain of NEs, for example synchronous multiplexers add-drop (SMA), with a SASE regenerating the synchronisation signal at an intermediate point in the chain. The arrows indicate the flow of synchronisation signals through the chain.

The SASE is connected to a SE situated at an intermediate point of the chain via a T4 output and a T3 input on the SE. A first connection is to a T4 synchronisation signal output (SSO) on the SE from which the SASE receives a synchronisation signal. A second connection is to a T3 synchronisation signal input (SSI) on the SE through which the SASE returns a synchronisation signal to the SE. In normal operation, as indicated in FIG. 1, the SASE returns to the T3 input the synchronisation signal received from the T4 output. The SASE regenerates the synchronisation signal received from the T4 output, applying phase smoothing and condition monitoring, and transmits the 'clean' synchronisation signal back into the T3 input of the SE. The same principle would apply to other network configurations, such as a ring of SMAs but for simplicity only a chain is discussed here. A definition of the operation of a SE using the SSM is given in ETSI specification pr ETS 300 417-6-1. With the SE supporting the SSM functions as defined by this standard, an SSM value can be assigned to the T3 input by the management system. Normally the management system will assign a value of quality level to the T3 input to reflect the quality of the synchronisation signal the SE is expected to receive at the T3 input in cases where the T4 output is not used. The management system referred to is the general management system which is used to control any SDH network. The definition of such a management system is built into the SDH standards. In summary, a central control SE can be used to communicate with any SE in the SDH network using a communication signaling system built into the SDH protocols. The system is based on the ISO 7 layer stack protocol and each SE contains a message routing and termination function to identify messages destined for itself and to pass on any messages destined for another SE. These messages allow the central controller to re-configure circuit connections (for carrying telecoms traffic), receive alarm and performance information and configure a multitude of features and configurable options on the NEs.

The assignment of a SSM value to a T3 input is one of these configurable options. Which SSM value is assigned will depend on the quality of the synchronisation signal connected at the T3 input and this will generally be foreknown by the operator who is making the assignment by means of the management system.

In normal operation the SSM value received from the STM-N input is transferred by the SE directly to the opposite STM-N output, along with the data. When an STM-N output uses as its synchronisation source the T3 input, i.e when a SASE or some other source is attached, the SSM value assigned to that T3 input will be transmitted in the S1 byte of the STM-N to successive NEs in the chain. However, as the quality of the T3 source can change, this initial quality level assignment can later become incorrect, for example when the piece of equipment supplying the synchronisation signal to the SE T3 input makes an autonomous decision to change its synchronisation source and hence quality. Hence it is possible for an incorrect SSM to be transmitted with the data signal. If loss of the synchronisation signal is detected at the T3 input, the SE will attempt to select another synchronisation source or will go into holdover mode. Holdover mode is a state whereby the SE temporarily uses an internal oscillator when no satisfactory external synchronisation reference is available. However, the poor quality of the internal oscillator compared to the external synchronisation sources means that a new external source needs to be found as soon as possible in order to maintain network stability. This is usually achieved by an automatic synchronisation recovery scheme.

Figure 2:
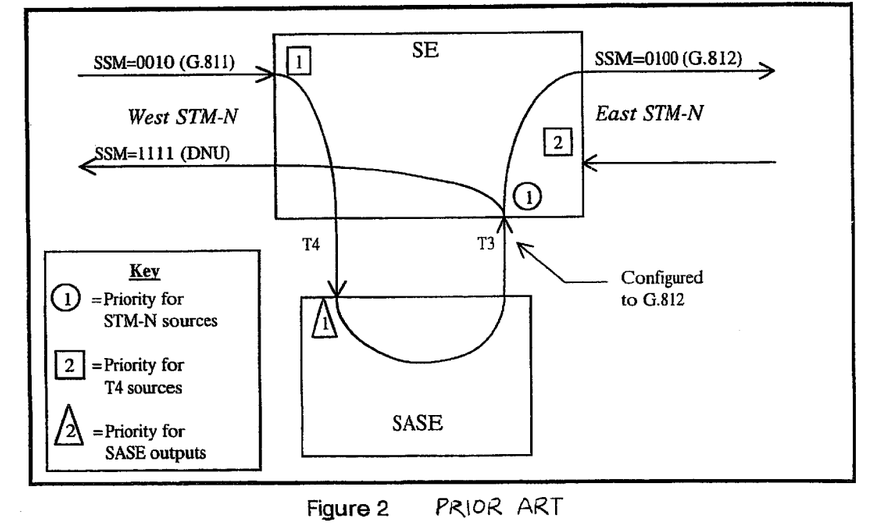

The limitations of the conventional system are illustrated by FIG. 2. In the following, connections to the left of a figure are referred to as "West" and connections to the right as "East". In FIG. 2 and subsequent figures, the priorities of various inputs and outputs are represented by numbers enclosed in circles, squares and triangles. Numbers in squares denote the priority of sources of synchronisation signal received at the SE via the STM-N ports, one of which sources is selected by the SE on the basis of its quality and priority, to provide the synchronisation signal output at T4. As indicated in FIG. 2, the West STM-N input has a quality level of G. 811 associated with it and is allocated priority 1 as a source of synchronisation signal for the T4 output. The East STM-N input is allocated priority 2, reflecting the fact that the synchronisation signal is passing in the direction from West to East along the chain of NEs so that a synchronisation signal received from the East direction is likely to have been looped back and therefore (having travelled further) be of lower quality than the synchronisation signal received from the West. Numbers in circles denote the priority of sources of synchronisation signal for output at the STM-N ports of the SE. In FIG. 2, there is only one source of synchronisation signal for the STM-N outputs and this is the T3 input which is therefore allocated priority 1.

Numbers in triangles denote priorities of synchronisation signals received at the SASE for output from the SASE. Again, in the example of FIG. 2, only one source is available (i.e the synchronisation signal received from the SE T4 output) and this is therefore allocated priority 1.

In more detail, FIG. 2 shows the SE of FIG. 1 forming part of a chain of NEs (not shown) and connected via its T3 input and T4 output to the SASE of FIG. 1. In the arrangement of FIG. 2, the SE and the SASE do not support the SSM on the T3 and T4 interfaces interconnecting them, i.e. these interfaces are not able to exchange SSMs. In FIG. 2, the synchronisation source from the West input has been selected for transmission via the T4 output to the SASE but, as the SSM value cannot be passed to the SASE, the SSM does not progress any further along the synchronisation chain. The SE uses the T3 source to synchronise both STM-N outputs (i.e. East and West) and uses the quality level (i.e. G.812 in the example) assigned to the T3 input to transmit a G.812 SSM in the East STM-N signal. The East synchronisation input is not used. In order to reflect the fact that the SE has looped back the synchronisation signal received from the West input to the West output, the West STM-N output signal will carry a SSM defined as Do-Not-Use (DNU).

References to G.811, G.812 and G.813 relate to respective ITU standards which define the quality of the original clock from which synchronisation is derived. ITU Recommendation G.707 defines SSM values relating to different qualities of original clock. Five SSM codes are defined in draft ETS1 recommendation prETS 300 417-6-1 to represent the synchronisation source quality level, listed in order of decreasing quality level as follows:

Code 0010 (Quality PRC) means the synchronisation source is a PRC clock (ETS 300 462-6 ITU-T Recommendation G.811);

Code 0100 (Quality SSU-T), means the synchronisation source is a transit SSU clock (ITU-T Recommendation G.812) or a Synchronous Supply Unit (SSU) that is defined in ETS 300 462-4;

Code 1000 (Quality SSU-L), means the synchronisation source is a SSU clock (ITU-T Recommendation G.812);

Code 1011 (Quality SEC), means the synchronisation source is a SEC clock (ETS 300 462-5, option 1 of ITU Recommendation G.813);

Code 1111 (Quality DNU), means the synchronisation signal carrying this SSM shall not be used for synchronisation because a timing loop situation could result if used.

In the example described above in relation to the arrangement of FIG. 2, we can clearly see the failure of the SE to carry forward the SSM timing quality information between West and East STM-N ports. This effectively breaks the synchronisation network signaling path and precludes the design of automatic recovery systems.

Figure 3:
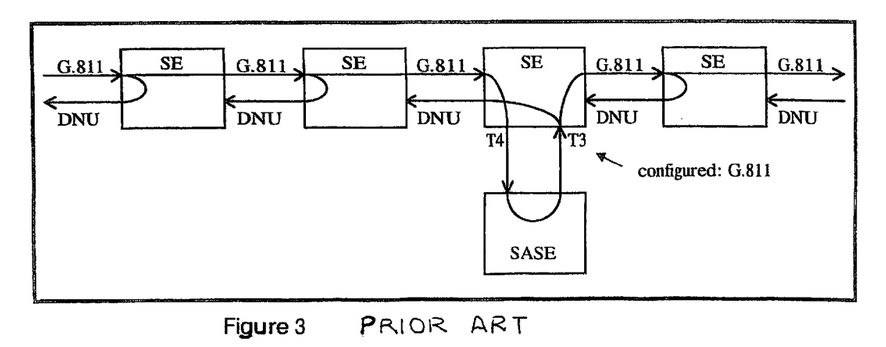
Figure 4:
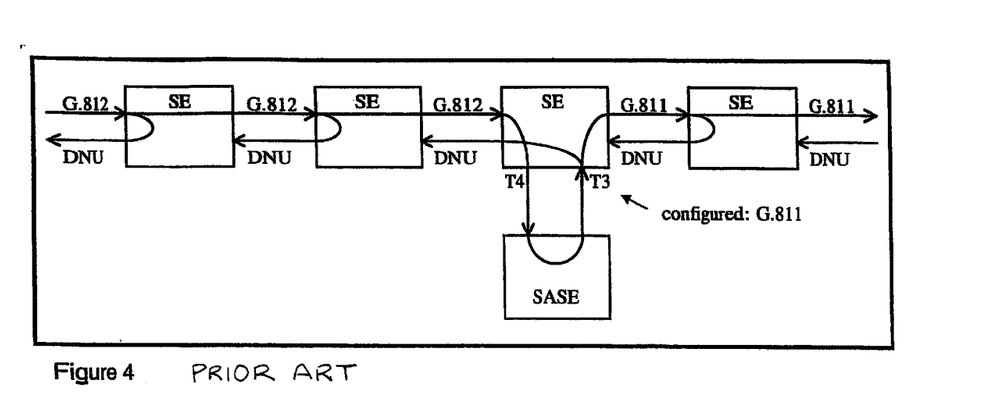

The limitations of SASE working in a chain of NEs will now be discussed with reference to FIGS. 3 and 4. FIG. 3 shows part of a SDH network similar to that shown in FIG. 1 comprising a chain of NEs in which a SASE is connected to one of the NEs and where the T3 SSM value is configured as G.811. G.811 would normally be configured on the T3 input as G.811 will be, in most cases, the SSM value received via the synchronisation path. If the SSM received from the West STM-N input changes from G.811 to G.812 (FIG. 4) the NEs to the East of the SASE will continue to receive a G.811 SSM (as configured at the T3 input). Consequently any other G.811 source which might be available further down the synchronisation path (i.e. to the East of the SASE) will not be selected, even though the synchronisation signal quality would be improved by its selection.

Figure 5:
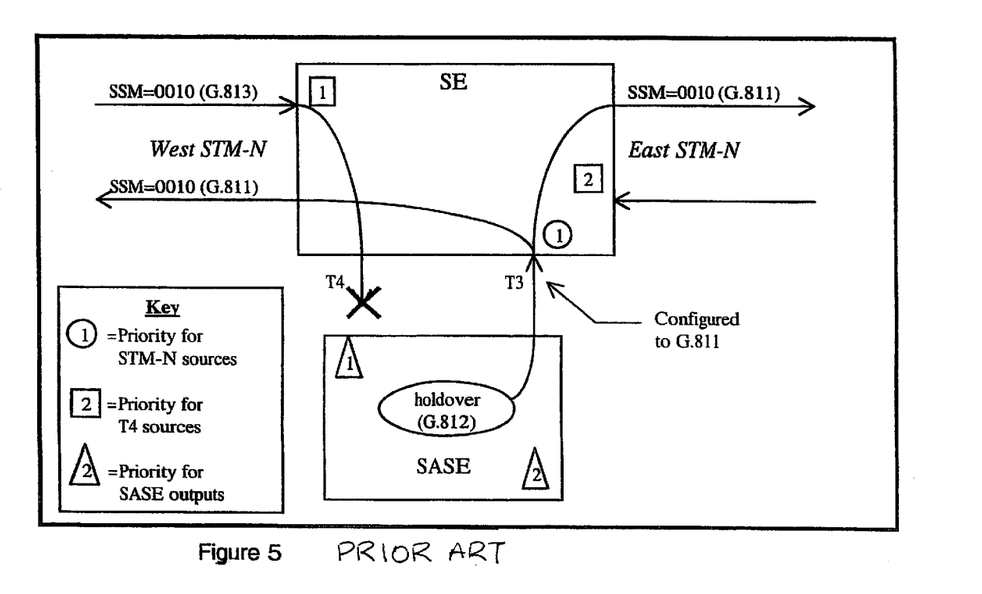

Another problem of the conventional arrangement is caused when the incoming SSM falls below the minimum quality threshold. The minimum quality threshold mechanism (or 'squelch' mechanism), defined by standards such as G.783 and prETS 300 417-6-1, allows the operator to define a minimum quality for the T4 output. When all synchronisation sources (e.g. STM-N inputs) available to the T4 output fall below this minimum quality level the T4 output is disabled ('squelched') by the SE as shown in FIG. 5 which forces the SASE to enter its own holdover mode (which is far superior to the holdover mode of the SE). A facility is defined in the above ETSI standard whereby the SE can remove the DNU SSM when a 'squelch' has occurred. But as FIG. 5 shows, the transmitted SSM can remain incorrect—East and West STM-N ports are here shown to transmit a G.811 SSM (as assigned to the T3 input) whereas the quality of the SASE in holdover mode is only G.812.

Figure 6:
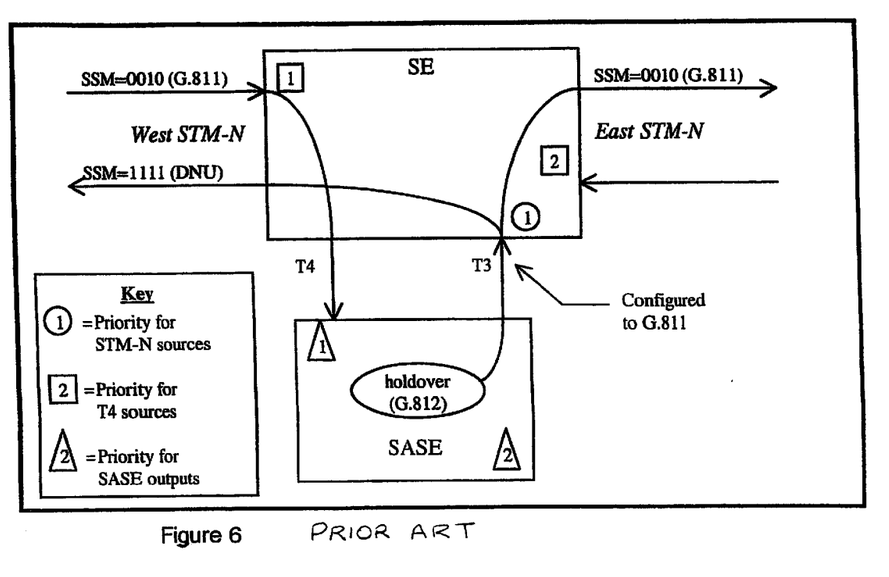

The above problem becomes worse when the SASE changes it's source of synchronisation or enters holdover mode without the knowledge of the SE. FIG. 6 shows the situation when the SASE autonomously enters holdover mode, using an internal synchronisation source in place of the SE T4 output signal. This results in the SE taking the synchronisation signal of quality level G.812 from the SASE but still using the assigned value of G.811 for transmission on the East port. The effect of this is to transmit an incorrect SSM in the Eastward direction as well as an unnecessary DNU SSM in the Westward direction.

Figure 7:
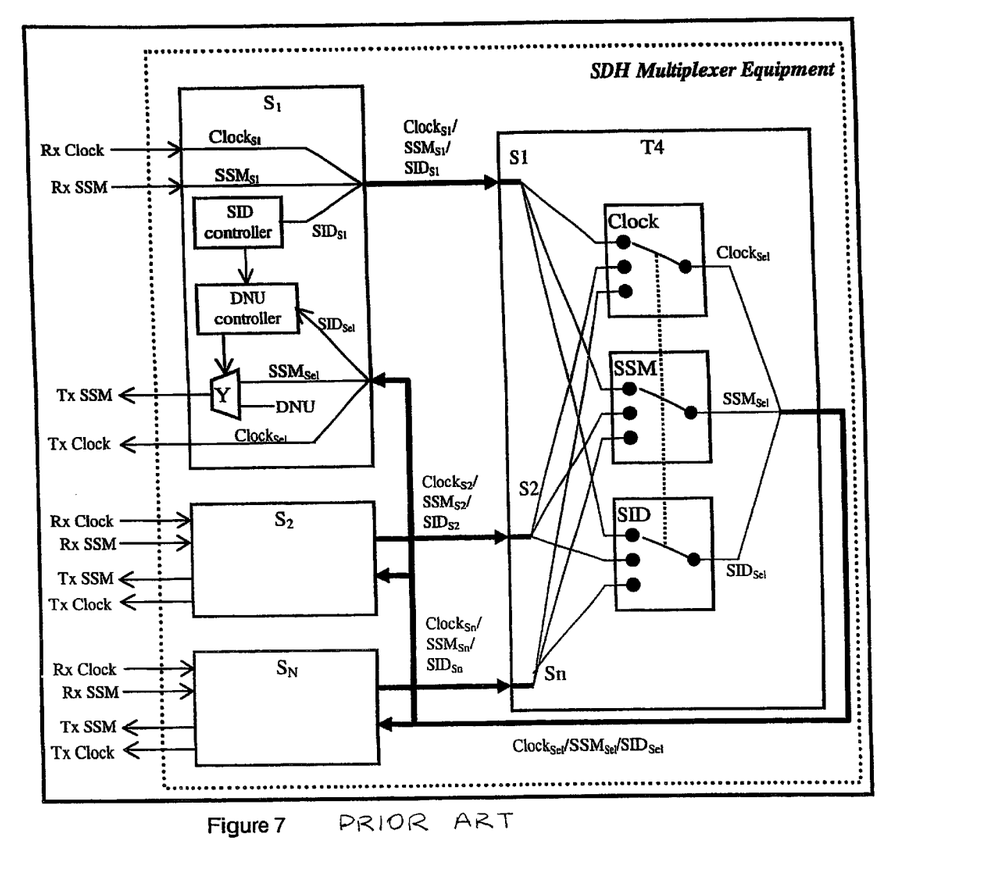

FIG. 7 shows the internal working of a conventional SE in more detail. For simplicity, discussion of the operation of the T3 and T4 ports is deferred until later. In FIG. 7 each STM-N port $S_1, S_2, \ldots S_n$ of the SE comprises a source identity (SID) generator, a DNU controller and an SSM output selector Y. The SID generator provides a unique value identifying the relevant port for accompanying the received synchronisation and SSM signals through the SE. The SID value is also passed to the DNU controller for the same STM-N port.

The selectors (T4) are shown schematically as comprising three, ganged, single-pole, multi-way switches, one switch for each of: the synchronisation signal (Clock), the SSM and the SID. Each switch takes an appropriate input from each of the STM-N ports. The outputs of the T4 selectors are denoted Clock$_{SEL}$, SSM$_{SEL}$ and SID$_{SEL}$, respectively. The ganged selectors in FIG. 1 are automatically controlled by the SE. The operator configures the equipment with a number of possible sources (S1, S2, . . . Sn) and the automatic selection will normally select the source that has the highest quality as determined from its SSM value. However there are, in practice a number of special modes whereby the selection of the highest quality can be withheld when the quality of source changes in order to reduce the number of intermittent changes. In practice, the switching functions, described above would typically be performed in software. Considering STM-N port S1: the SSM value and synchronisation signal (SSM$_{S1}$, Clocks$_{S1}$,) are derived from the STM-N inputs Rx Clock, Rx SSM and pass to the T4 selectors along with the locally generated SID value (SID$_{S1}$) unique to the port. The T4 selectors route the synchronisation signal received from a selected one of the STM-N ports for output from all of the STM-N ports. This selection process involves distribution of the synchronisation signal, the SSM and the SID in a ganged manner, i.e. the synchronisation signal SSM and SID from a single STM-N port are selected together, and are then returned to all of the STM-N ports where the synchronisation signal and SSM are output from the SE but the SID is terminated at the DNU controller.

The DNU controller compares the SID of signals received from the selectors (SIDsel) with the SID applied directly from the local SID generator (SID$_{sx}$, where x=1, 2 . . . N). If the two SID values agree then the signals received from the selectors are the same as those input to that port from the STM-N link, so in transmitting these same signals back to the same STM-N link, a loop-back is generated. In order to alert NEs connected to this STM-N link to this state of affairs, the STM-N port outputs a DNU SSM under control of the DNU controller. The DNU controller controls the operation of the SSM output selector Y to output either the SSM value received from the selectors (SSM sel) or the DNU value, accordingly.

In the example shown in FIG. 7, port $S_1$ will output a Tx SSM of DNU while all other ports will present a $T_X$ SSM derived from SSM$_{S1}$.

Figure 8:
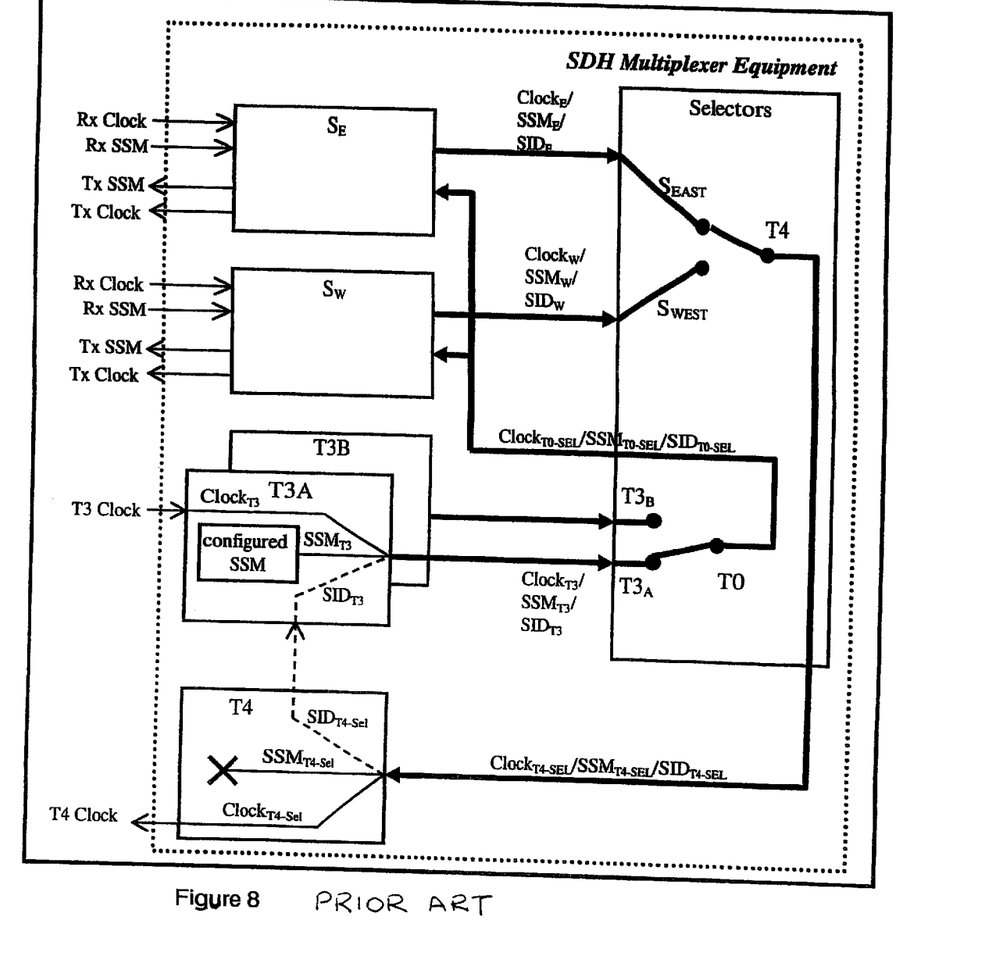

FIG. 8 shows the T3 input and T4 output ports incorporated into the scheme of FIG. 7. In FIG. 8 the multiple STM-N ports $S_1, S_2, \ldots S_N$ are represented for simplicity by an East port, $S_E$ and a West port $S_W$. The multiple ganged switches of the selectors of FIG. 7 are represented here by a single switch (T4sel). Thickened signal lines are used to indicate the combination of the synchronisation signal, SSM and SID signal lines. In addition, a further switch (T0) is shown for selecting between the signals Clock$_{T3}$, SSM$_{T3}$ and SID$_{T3}$ fed from the plurality of T3 ports for passing to the STM-N outputs. The outputs of the T0 selectors are denoted Clock$_{T0SEL}$, SSM$_{T0SEL}$ and SID$_{T0SEL}$, respectively. Here two identical T3 inputs (T3$_A$, T3$_B$) are used to provide alternative sources of synchronisation signal for the STM-N outputs for protection purposes. A selected one of the STM-N inputs supplies synchronisation signal (Clock$_{T4SEL}$), SSM$_{T4SEL}$ and SID$_{T4SEL}$ to the T4 output. In each case the synchronisation signal simply passes through the T3/T4 ports, from and to the exterior of the SE respectively.

The SID value (SID$_{T4-SEL}$) supplied to the T4 output from the T4 selectors can be passed within the SE from the T4 output port to both T3 input ports T3$_A$, T3$_B$ to generate, in the case where an external SASE unit links the T3 and T4 interfaces, a $SID_{T3}$ value for supply from the $T3_A$ or $T3_B$ input port to the STM-N ports as selected by selector T0. (In this case the SASE will feed the T4 synchronisation signal to the T3 input port). Hence, the full path for the synchronisation signal, in the case shown, would be STM-N input ($S_E$) fed via the selector T4 to the T4 output, out of the T4 port, then back into the T3 port and via the selector T0 to supply each of the STM-N output interfaces $S_E$, $S_W$. By referring back to FIG. 7, it is possible to see how the SID generated by the East STM-N port is returned to the DNU generator of the same port when the selector positions are as shown. Hence the East port Tx SSM will have a value set to DNU.

Figure 9:
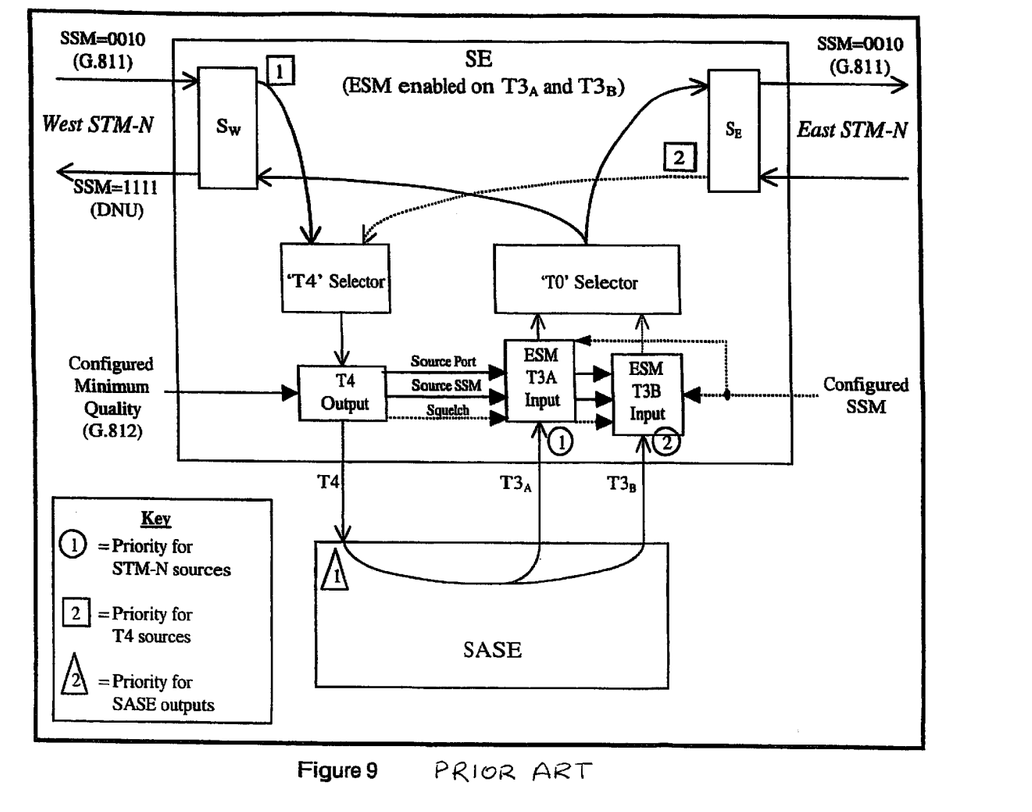
FIGS. 9 to 14 show a SDH equipment in a telecommunications system according to embodiments of the invention.

The first embodiment of the present invention will now be described with reference to FIG. 9. According to FIG. 9, the SE is provided with two T3 inputs $T3_A$ and $T3_B$, each forming an input to the T0 selector. The SASE provides two synchronisation signal outputs, one connected to each T3 input and both supplied with the synchronisation signal received at the SASE from the T4 output. FIG. 9 illustrates an arrangement of this embodiment in the normal situation where no faults have occurred, i.e. the SASE accepts the synchronisation signal from the T4 output and passes it on to the T3 inputs. Since the $T3_B$ input has a lower priority (priority level 2) than $T3_A$ (priority level 1) it will not be selected by the T0 selector in normal operation.

In the SE of FIG. 9, both of the T3 input ports support the "enhanced SASE mode" (ESM) according to the present invention. As can be seen from FIG. 9, an SE according to the first embodiment of the invention comprises an SSM value ("configured SSM")associated with each of the two T3 inputs (T3A, T3B) and a further SSM value ("configured minimum quality") associated with the T4 output. The three arrows from the T4 output to the T3 inputs indicate the transfer of the following information: the identity (SID) of the source STM-N port selected by the T4 output to provide the synchronisation signal to be output, is supplied to both T3 inputs T3A, T3B. As both T3 inputs support ESM, the SSM (Source SSM) associated with the selected synchronisation signal and notification (Squelch) in case the T4 output is squelched by the SE are also supplied to both T3 inputs. The T3 inputs need to be specially configured when a synchronisation signal is passed from the T4 output to the T3 input, e.g when the T3 and T4 interfaces are connected externally to the SE e.g. via a through-timed SASE as shown for example in FIG. 3. A solid line in FIG. 9 and subsequent figures between the T4 and T3 functional blocks denotes information transfer, a dotted line indicates no information transfer.

Advantageously according to the present invention, the SSM value provided by the T3 inputs to the T0 selectors is made to dynamically follow the SSM value received by the T4 output from the STM-N synchronisation source selected by the T4 output. In effect this means passing the SSM value within the SE from the T4 output to the T3 inputs.

Hence the system according to the present invention as described above is capable of emulating an SDH network with fully functional SE clock interfaces. The SSM that is supplied to the T3 input is that which would have been sent to the SASE (i.e. if the T4 output supported SSMs) and would have been received by the T3 inputs from the SASE (i.e. if the T3 inputs also supported SSMs).

The invention will now be explained in more detail by reference to FIGS. 9 and 10. In FIG. 9 the synchronisation signal output from the T4 output is derived from the selected source port (in the example of the Figure, the West STM-N input). As the T3 and T4 clock interfaces are in use for transferring the synchronisation signal, the synchronisation source quality information associated with the signal from the source port (i.e. the source SSM, in this case G.811) is passed from the T4 output to the T3 inputs by the SE. This information is then used to generate the SSMs for the outputs synchronised to the synchronisation signal received at the selected T3 input: the East STM-N output transmits an SSM of G.811 but the West STM-N output transmits a DNU SSM which reflects the fact that timing is looped back. The STM-N outputs are able to identify the looping back of the synchronisation signal by virtue of the source identity (SID) transferred via the T4 outputs and the selected T3 input. If the incoming West SSM were to change to G.812 then this new value would be automatically forwarded within the SE via the T4 output and the selected T3 input to the Eastbound STM-N output.

As before, the selection of synchronisation source for the T4 output (in the situation where there is more than one available) is controlled with reference to a priority table in the SE and the signal quality levels. There are different, optional methods for how the selection can be made but the normal method is for the source with the highest quality (as indicated by the SSM value on the signal) to be selected and if two sources of equal quality are available then the one with the highest pre-defined priority is used.

Figure 10:
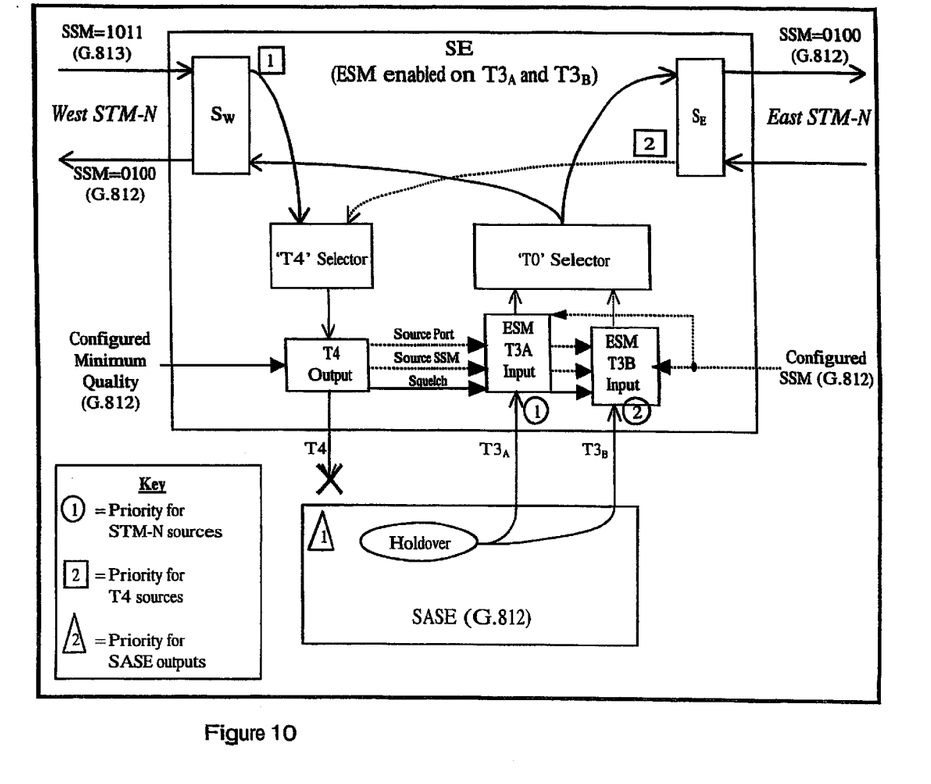

As shown in FIG. 10, according to the first embodiment, if all the synchronisation sources identified as being available to the T4 output fall below the preset minimum T4 quality threshold (e.g. G.812) the T4 output will be squelched by the SE. In this situation the T4 output asserts the "Squelch" signal within the SE to the T3 inputs which then select, in place of the SSM from the selected source port, the SSM value ("configured SSM": in this case G.812) assigned to the selected T3 input for sending to the STM-N outputs. Normally the management system will assign a value of quality level to reflect the quality of the synchronisation signal the SE is expected to receive at the T3 input in cases where the T4 output is not used. If the T4 output is not used, the T3 inputs select their own SID value as assigned by the management system for transmission on STM-N outputs in place of the source information (SID) received from T4. FIG. 10 shows the situation where the SASE enters holdover mode in response to the T4 output being squelched and, in response to the squelch signal, the SSMs transmitted by the West and East STM-N outputs change to the assigned value of G.812.

Figure 11:
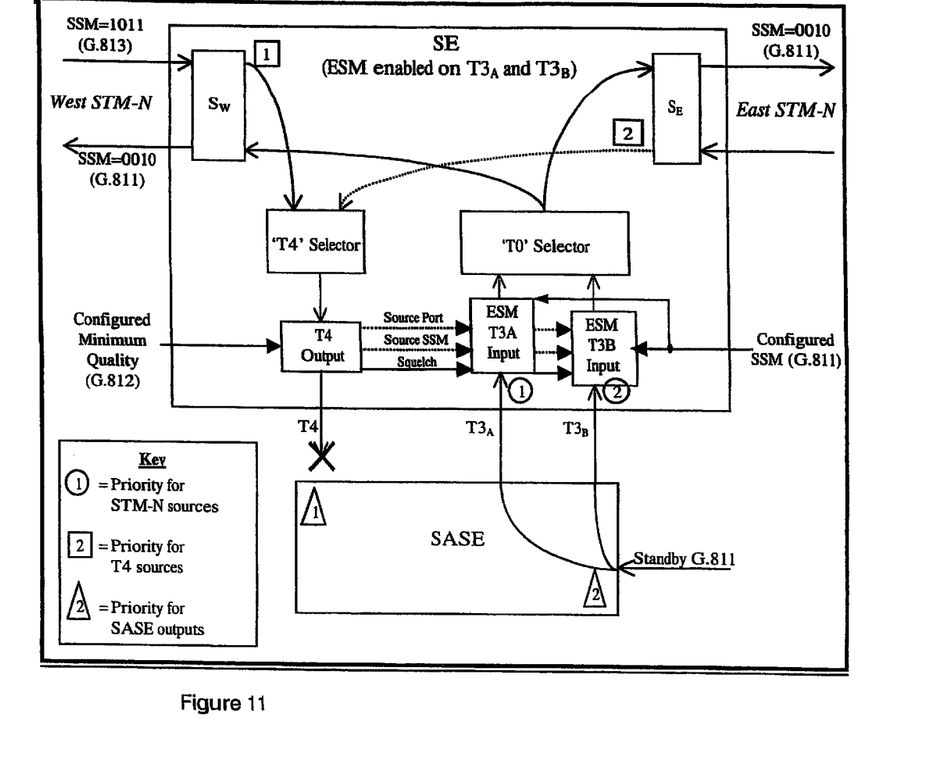

According to an alternative embodiment, as shown in FIG. 11, a second, external synchronisation source (i.e. in addition to that provided via the T4 output of the SE) with an SSM of G.811 is available as an input to the SASE. Here the T3 inputs $T3_A$, $T3_B$ have a SSM value of G.811 assigned to reflect the known quality level of the external source and the T4 minimum quality threshold is set to G.812. If the SSM value received by the selected West STM-N input falls below G.812 (i.e. to G.813, as shown) then the T4 output is squelched. The SASE detects the loss of the synchronisation signal from the SE T4 output and selects its other synchronisation source for supplying to the SE T3 inputs. As there is no synchronisation loop back in this situation, the configured SSM of the T3 inputs is transmitted on both STM-N outputs.

Figure 12:
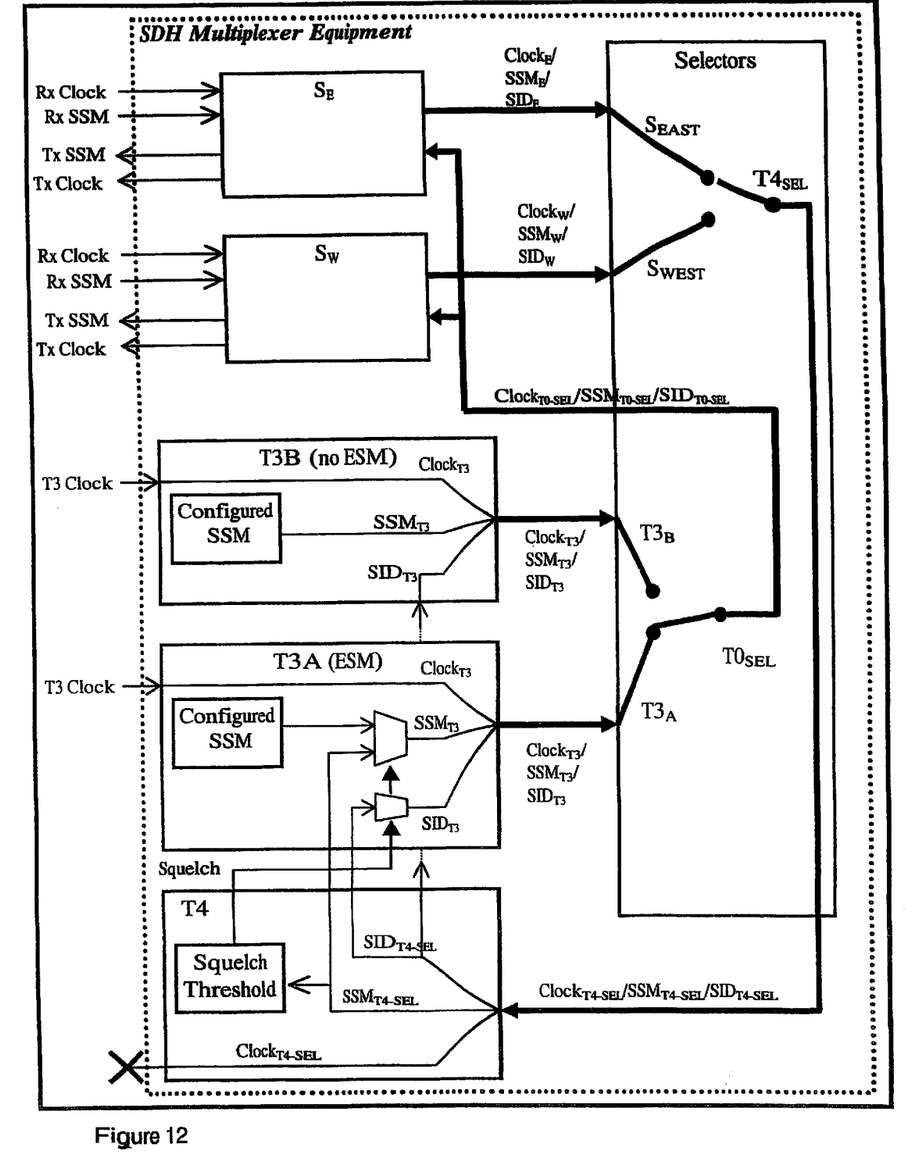

FIG. 12 shows the principle of the present invention in more detail with reference to a further embodiment of the present invention. As in FIG. 9 the two T3 inputs $T3_A$, $T3_B$ provide alternative sources of the synchronisation signal ($Clock_{T3}$) and $SSM_{T3}$ for selection by selector T0 for output from the STM-N ports, and the STM-N input selected by selectors T4 supplies the equivalent signals to the T4 output. Unlike the first embodiment, described above, of the two T3 inputs, one supports ESM ($T3_A$) and one does not ($T3_B$). The $T3_B$ input is thus configured as a conventional T3 input.

The operation of ESM depends largely on the Squelch Threshold function: when the SSM of the selected STM-N port is above the configured quality level, the SSM and SID selected by selector T4 for the T4 port ($SSM_{T4\text{-}SEL}$ and $SID_{T4\text{-}SEL}$ respectively) are simply passed through to the ESM T3 port ($T3_A$) and routed to all the STM-N ports. Hence the SID generated by the East STM-N port is returned to the DNU generator of the same port when the selectors (T4, T0) positions are as shown in FIG. 7 and the East port output SSM will have a value of DNU.

When the SSM of the selected STM-N port is below the T4 configured minimum quality level, the squelch control line from the T4 port alters the SSM and SID values ($SSM_{T3}$ and $SID_{T3}$ respectively) provided by the ESM T3 input. The SSM provided by the ESM T3 input $T3_A$ is now derived from the Configured SSM and the T3 SID is disabled or replaced by a null value, such that the DNU controller is not activated. Output of the selected synchronisation signal $Clock_{T4SEL}$ from the output T4 is inhibited.

When the ESM function is not used at a T3 input (e.g. at an SE without a connected SASE) the ESM is disabled under management control. In this case the T3 SSM is always generated from the Configured SSM value and the T3 SID is derived from the T4 SID ($SID_{T4\text{-}SEL}$), as shown by the upper, non-ESM T3 function ($T3_B$), or the T3 SID is disabled or replaced by a null value, such that the DNU controller is not activated.

Figure 13:
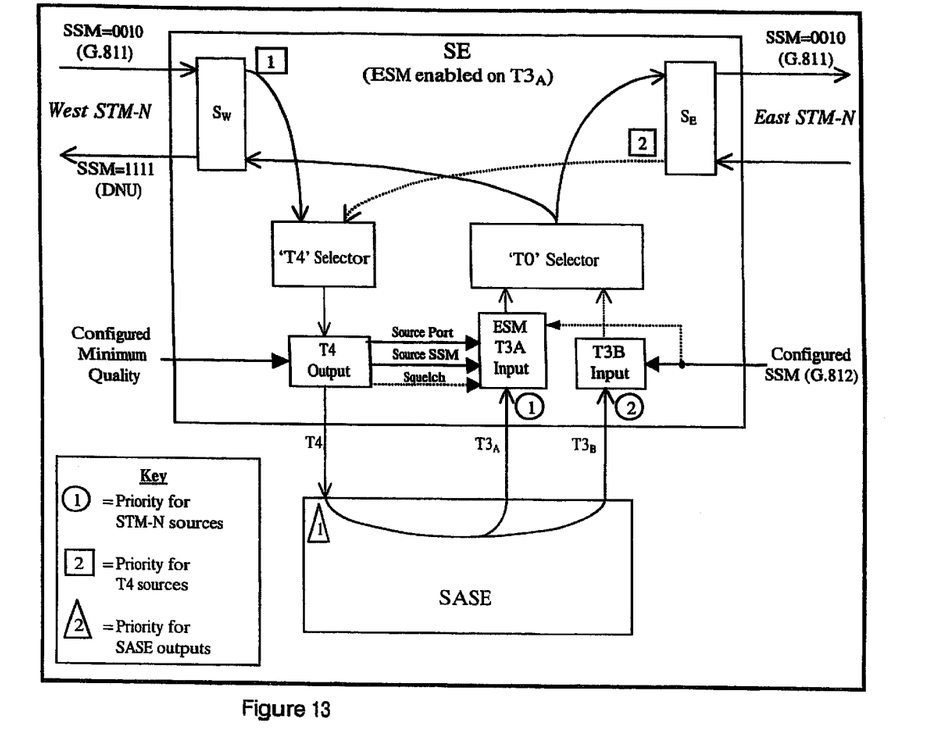
Figure 14:
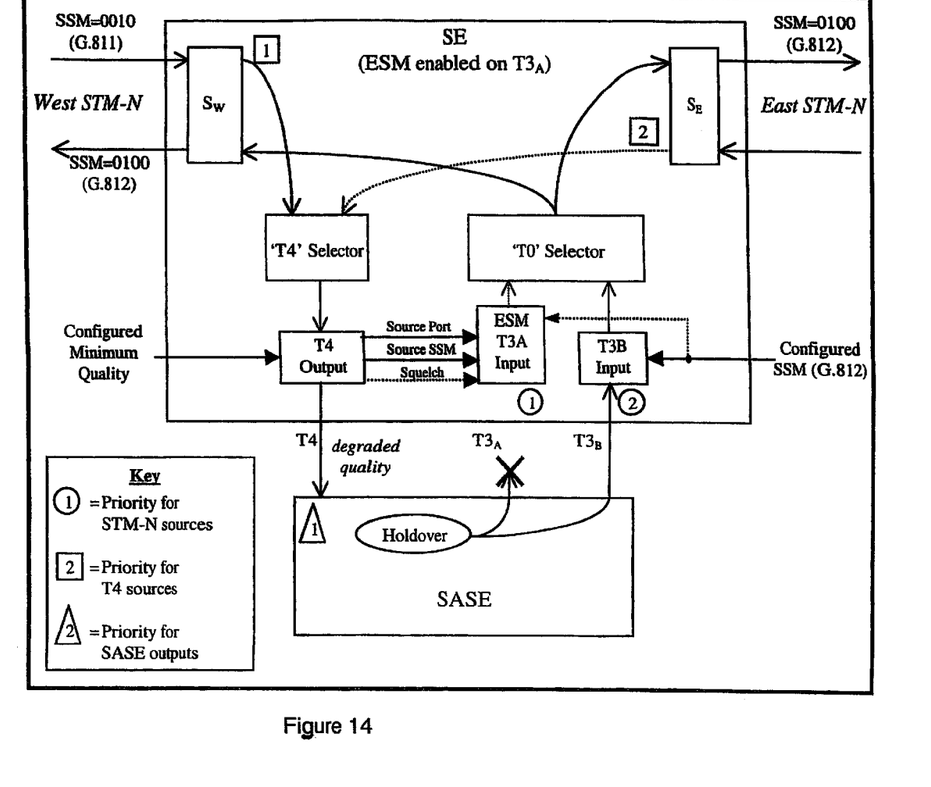

FIG. 13 shows an arrangement similar to that in FIG. 9 except that now only the $T3_A$ input supports ESM functionality. The advantages of this arrangement will now be described with reference to FIG. 14. FIG. 14 shows the arrangement of FIG. 13 in the situation where the SASE has rejected the synchronisation signal received from the T4 output of the SE and, as a result the SASE has entered its own holdover mode. In holdover mode the SASE squelches the synchronisation signal output to the $T3_A$ input of the SE, but maintains the synchronisation signal output to the $T3_B$ input. In the absence of a synchronisation signal from the (higher priority) T3 input $T3_A$, the SE selects the synchronisation signal from the alternative T3 input $T3_B$. As the $T3_B$ input does not support ESM, it does not receive the SSM from the T4 output and hence supplies the configured SSM value along with the (SASE generated) synchronisation signal.

Advantageously, modifying existing NEs to implement the invention could be achieved relatively simply, e.g. with a software change whereas modifying the NEs to support SSM on the SE clock interfaces is a more difficult and expensive option.

The skilled worker in the relevant technical field would realise that the above embodiments do not restrict the scope of the invention which is also applicable to other network topologies such as rings as it is applicable to NEs with more than two data ports.

SDH and SONET are alternative standards for synchronous communication hierarchies and the skilled worker in the field would appreciate that the present invention applies equally to SONET as it does to SDH communications networks.

I claim:

1. A telecommunications system, comprising:
    a) a plurality of interconnected network elements (NEs), each NE comprising at least one port;
    b) each NE being operative for inputting from at least one other NE, via said at least one port, a signal comprising data and a synchronization signal for synchronizing the data and a quality level indication (QLI) determined by a quality of a source of the synchronization signal;
    c) each NE being operative for outputting to said at least one other NE, via said at least one port, a signal comprising data and a synchronization signal for synchronizing the data and a QLI;
    d) a particular one of the plurality of NEs comprising a synchronization signal output (SSO) operative for outputting a particular synchronization signal received as part of the signal at said at least one port or at a particular one of the ports;
    e) the particular NE comprising a first synchronization signal input (SSI) operative for inputting the particular synchronization signal output from the SSO with no QLI;
    f) the particular NE comprising means for sending the particular synchronization signal input at the first SSI, as part of the signal output from said at least one port, for synchronizing the data therein; and
    g) the particular NE also comprising QLI means for associating the particular one of the input QLIs determined by the quality of the source of the particular synchronization signal with the particular synchronization signal input at the first SSI for sending as part of the signal output from said at least one port.

2. The telecommunications system of claim 1, in which the particular NE also comprises a second SSI operative for inputting a further synchronization signal.

3. The telecommunications system of claim 2, in which the QLI means comprises means for associating the particular QLI with the particular synchronization signal input at each SSI.

4. The telecommunications system of claim 1, in which the QLI means comprises selection means for selecting one of the particular QLI and a predetermined QLI for associating with the synchronization signal input at the first SSI.

5. The telecommunications system of claim 2, in which the QLI means comprises selection means for selecting one of the particular QLI and a predetermined QLI for associating with the synchronization signal input at the second SSI.

6. The telecommunications system of claim 4, in which the predetermined NE comprises squelch means for inhibiting output of the particular synchronization signal from the SSO if the quality level associated with that signal falls below a predetermined level.

7. The telecommunications system of claim 6, in which the selection means selects the predetermined QLI when the output of the particular synchronization signal from the SSO port is inhibited and otherwise selects the particular QLI.

8. The telecommunications system of claim 4, in which the selection means comprises detection means for detecting a synchronization signal at the first SSI, and means for selecting the predetermined QLI when the detection means does not detect a synchronization signal at the first SSI.

9. The telecommunications system of claim 2, and a stand-alone synchronization equipment (SASE) comprising a first input for receiving the particular synchronization signal output from the SSO, and first and second outputs for sending the particular synchronization signal input from the SSO to the first SSI and the second SSI, respectively.

10. The telecommunications system of claim 9, in which the SASE comprises means for sending an alternative synchronization signal to the first and second SSI in place of the particular synchronization signal.

11. The telecommunications system of claim 10, in which the SASE comprises means for sending the particular synchronization signal received from the SSO to both SASE outputs in normal operation and, if the quality level of the particular synchronization signal received from the SSO falls below a predetermined threshold, for inhibiting outputting the particular synchronization signal from the first SASE output and for outputting the alternative synchronization signal from the second SASE output.

12. The telecommunications system of claim 1, in which the NEs comprise sychronous multiplexers add-drop (SMA).

13. The telecommunications system of claim 1, in which the NEs are connected to form a ring.

14. The telecommunications system of claim 1, in which the sychronization signal QLI is carried in a synchronization status message (SSM) comprised in the synchronization signal.

* * * * *